United States Patent
Hotta et al.

(10) Patent No.: US 8,345,529 B2
(45) Date of Patent: Jan. 1, 2013

(54) OPTICAL PICKUP APPARATUS WITH ASTIGMATISM CORRECTING COLLIMATING LENS

(75) Inventors: Tohru Hotta, Okaya (JP); Ryoichi Kawasaki, Isesaki (JP)

(73) Assignees: Sanyo Electric Co., Ltd., Osaka (JP); Sanyo Optec Design Co., Ltd., Tokyo (JP)

( * ) Notice: Subject to any disclaimer, the term of this patent is extended or adjusted under 35 U.S.C. 154(b) by 0 days.

(21) Appl. No.: 13/013,457

(22) Filed: Jan. 25, 2011

(65) Prior Publication Data
US 2012/0026859 A1   Feb. 2, 2012

(30) Foreign Application Priority Data
Jan. 26, 2010  (JP) .................................. 2010-013783

(51) Int. Cl.
*G11B 7/00*    (2006.01)
(52) U.S. Cl. .................. 369/112.23; 369/53.25
(58) Field of Classification Search .................. None
See application file for complete search history.

(56) References Cited

U.S. PATENT DOCUMENTS

| | | | | |
|---|---|---|---|---|
| 5,872,760 | A * | 2/1999 | Kim et al. | 369/112.24 |
| 7,045,810 | B2 * | 5/2006 | Tatsumi | 257/14 |
| 2005/0002289 | A1 * | 1/2005 | Mori | 369/44.23 |
| 2007/0014210 | A1 * | 1/2007 | Nishioka | 369/44.32 |
| 2007/0153645 | A1 * | 7/2007 | Kikuchi et al. | 369/44.23 |
| 2008/0080337 | A1 * | 4/2008 | Kamioka | 369/44.23 |
| 2008/0279057 | A1 * | 11/2008 | Tashiro et al. | 369/44.23 |

FOREIGN PATENT DOCUMENTS

JP    2001-307362    11/2001

* cited by examiner

*Primary Examiner* — Paul Huber
(74) *Attorney, Agent, or Firm* — SoCal IP Law Group LLP; Steven C. Sereboff; John E. Gunther

(57) ABSTRACT

An optical-pickup apparatus includes: a laser diode having a first-laser element, which emits a first-laser beam, and a second-laser element, which emits a second-laser beam having a wavelength shorter than a wavelength of the first-laser beam, arranged in the same package; an objective lens to condense the first- and second-laser beams emitted from the laser diode to signal-recording layers of first- and second-optical discs, respectively, the second-optical disc being of a standard different from a standard of the first-optical disc; and a collimating lens arranged in an optical path between the laser diode and the objective lens, the collimating lens configured to change the first- and second-laser beams from divergent light to parallel light, the collimating lens being inclined with respect to optical axes of the first- and second-laser beams so that astigmatism in the first- and second-laser beams is corrected.

10 Claims, 3 Drawing Sheets

OPTICAL PICKUP APPARATUS WITH ASTIGMATISM CORRECTING COLLIMATING LENS

CROSS-REFERENCE TO RELATED APPLICATION

This application claims the benefit of priority to Japanese Patent Application No. 2010-013783, filed Jan. 26, 2010, of which full contents are incorporated herein by reference.

BACKGROUND OF THE INVENTION

1. Field of the Invention

The present invention relates to an optical pickup apparatus configured to perform an operation of reading a signal recorded in an optical disc.

2. Description of the Related Art

An optical disc device is widely available, which is capable of performing an operation of reading a signal and an operation of recording a signal with a laser beam emitted from an optical pickup apparatus being applied to a signal recording layer of an optical disc.

As the optical disc device, those using optical discs called CDs and DVDs are widespread in general. As the laser beam to perform the operation of reading a signal recorded in an optical disc of CD standard, infrared light having a wavelength of 780 nm is used, while as the laser beam to perform the operation of reading a signal recorded in an optical disc of DVD standard, red light having a wavelength of 650 nm is used.

A protective layer disposed on an upper face of the signal recording layer in the optical disc of CD standard has a thickness of 1.2 mm, and an objective lens to be used for the operation of reading a signal from the signal recording layer is specified to have a numerical aperture of 0.45. Also, a protective layer disposed on an upper face of the signal recording layer in the optical disc of DVD standard has a thickness of 0.6 mm, and an objective lens to be used for the operation of reading a signal from the signal recording layer is specified to have a numerical aperture of 0.6.

In an optical pickup apparatus, which is configured such that the operation of reading a signal recorded in the optical disc of CD standard and the operation of reading a signal recorded in the optical disc in the DVD standard as described above are performed by a light condensing operation of the same objective lens, a light flux of laser beams incident onto the objective lens in accordance with the wavelength of the laser beam emitted from a laser diode in use is configured to be limited in accordance with the numerical aperture.

In order to perform an operation of changing the numerical aperture, a configuration is such that a wavelength selection filter is used, an aperture stop with different opening diameters is mechanically stopped down or a liquid crystal shutter is used. Also, as a method of performing the operation of reading signals recorded in the optical discs of CD standard and DVD standard using the same objective lens, a method of using an objective lens called bifocal lens having two focuses is also employed.

In the optical pickup apparatus which is configured so as to be able to perform the operation of reading signals recorded in the optical discs of the above-described different standards, two laser diodes which emit laser beams of different wavelengths are included, however, in order to simplify a configuration of an optical system, a laser diode called a two-wavelength laser diode has been commercialized, which is provided, in the same package, with a first laser element configured to emit a first laser beam and a second laser element configured to emit a second laser beam of a wavelength different from that of the first laser beam.

Such an optical pickup apparatus, which is configured so as to perform the operation of reading signals recorded in the optical discs of different standards using the first laser light and the second laser light emitted from the above described two-wavelength laser diode, is described in the Japanese Patent Laid-Open Publication No. 2001-307362, for example.

FIG. 1 is an optical layout diagram of an optical pickup apparatus, which is configured such that the first laser beam and the second laser beam emitted from the two-wavelength laser diode are collected by one objective lens to the signal recording layers provided in the optical discs of the different standards, and a description will be given, as an example, of an optical pickup apparatus configured so as to be able to perform the operation of reading signals recorded in a first optical disc D1 of CD standard and in a second optical disc D2 of DVD standard.

In this description, omitted are optical components such as a quarter-wave plate, which converts the laser light from linearly polarized light into circularly polarized light, and to the contrary, from circularly polarized light to linearly polarized light, an anamorphic lens, which corrects various aberrations included in return light to be applied to a photodetector.

In this figure, reference numeral 1 designates a two-wavelength laser diode, in which a first laser element 2 configured to emit a first laser beam having a wavelength, e.g., 780 nm, which is suitable for reading a signal recoded in the first optical disc D1 of CD standard, and a second laser element 3 configured to emit a second laser beam having a wavelength, e.g., 650 nm, which is suitable for reading a signal recorded in the second optical disc D2 of DVD standard, are arranged on the same semiconductor substrate and provided in the same package.

Reference numeral 4 designates a diffraction grating, on which the first laser beam and the second laser beam emitted from the two-wavelength laser diode 1 are incident and which performs a diffraction action on the second laser beam, and the diffraction grating is configured so as to split the second laser beam to generate a main beam, which is a 0-order beam, and a sub beam, which is a ±first-order beam. The diffraction grating 4 has a diffraction action on the second laser beam, but does not act on the first laser beam at all but is configured so as to allow the first laser beam to pass therethrough as the main beam of the 0-order beam.

Reference numeral 5 designates a parallel plate type semi-transparent mirror, which is arranged in an oblique manner so as to reflect the first laser beam and the second laser beam having passed through the diffraction grating 4, and which allows return light, which will be described later, to pass therethrough and causes astigmatism. Reference numeral 6 designates a collimating lens, on which the first laser beam and the second laser beam reflected by the semitransparent mirror 5 are incident, and which is configured so as to change the incident light from divergent light to parallel light.

Reference numeral 7 is an objective lens, on which the first laser beam and the second laser beam that are parallel light having passed through the collimating lens 6 are incident, and which is configured so as to collect the first laser beam to a signal recording layer L1 of the first optical disc D1 and the second laser beam to a signal recording layer L2 of the second optical disc D2.

The objective lens 7 is configured so as to function as an objective lens having numerical aperture of 0.45 of CD standard or numerical aperture of 0.6 of DVD standard, by switching the diameter of an aperture stop provided so as to limit a light flux of each laser beam which is incident thereon according to the wavelength of the first laser beam and the wavelength of the second laser beam, or by being configured using a bifocal lens.

The first laser beam and the second laser beam, which is emitted from the two-wavelength laser diode 1 through an optical path constituted of the above-described optical components, is incident on the objective lens 7, and thus the first laser beam and the second laser beam are condensed to the signal recording layer L1 of the first optical disc D1 and the signal recording layer L2 of the second optical disc D2 by means of the light condensing operation of the objective lens 7, so that laser spots are formed which are suitable for reading signals recorded in the optical discs.

With such an operation, the laser spots are formed on the signal recording layer L1 of the first optical disc D1 and the signal recording layer L2 of the second optical disc D2, and at the same time, the laser beams are reflected from the signal recording layer L1 and the signal recording layer L2 as return light.

The return light of the first laser beam and the second laser beam reflected as such is incident on the semitransparent mirror 5 through the objective lens 7 and the collimating lens 6. The return light has been converted by a phase shift operation performed by the quarter-wave plate (not shown), as is well known, into linearly polarized light in a different direction, and thus it is not reflected by the semitransparent mirror 5 but passes through the semitransparent mirror 5.

The first laser beam and the second laser beam having passed through the semitransparent mirror 5 are given astigmatism, which is to be used in a focus control operation, and are applied to a photodetector 8. The photodetector 8 includes a four-divided sensor which is described in the above publication.

With the two-wavelength laser diode which is provided, in the same case, with the two laser elements configured to emit laser beams having different wavelengths, an optical path can be used for two laser beams, and thus there is such an advantage that optical composition of the optical pickup apparatus can be simplified.

Mainly used is the laser diode, included in the optical pickup apparatus configured to perform the operation of reading a signal recorded in the optical disc, which oscillates substantially at a single wavelength called a single mode, but it has such a problem that noise may be generated due to irregular reflection light reflected from the signal recording layer of the optical disc, which is called return light, when the laser beam is oscillated.

As a method for solving such a problem, used is a method for superimposing a high-frequency signal on a driving signal supplied to the laser diode, but there are not only a problem that such a method is expensive since a circuit for generating the high-frequency signal is required, but also a problem that measures should be taken against unnecessary radiation such as a shielding from an electromagnetic wave generated from superimposed integrated circuit components provided in order to generate the high-frequency signal.

As a laser diode that solves such problems, a laser diode capable of self-pulsation, that is, self-excited oscillation has been recently commercialized. FIG. 3 is a diagram for describing a shape of emission of the laser beam emitted from the laser diode, and the emitted laser beam is not in a circular shape but in an elliptical shape.

The laser beam emitted as such becomes an elliptical shape with a longer diameter in the perpendicular direction relative to a diameter in the parallel direction with respect to a junction portion, which is an active layer K making up the laser diode. A distance S between a virtual light emitting point P1 in the long diameter direction and a virtual light emitting point P2 in the short diameter direction of the laser beam is an astigmatic difference, and there is such characteristics that the magnitude of the astigmatic difference varies with types of the laser diode.

If the laser diode has the above-described astigmatic difference, astigmatism occurs which is caused by the astigmatic difference, and particularly the pulsation type laser diode has a large astigmatic difference, which leads to a problem that the astigmatism, caused by the astigmatic difference, becomes large.

Also, since the first laser element 2 and the second laser element 3 included in the two-wavelength laser diode are arranged in a manner slightly distant from each other, their optical axes are deviated. And there is such a problem that the astigmatism occurs with this deviation.

SUMMARY OF THE INVENTION

An optical pickup apparatus according to an aspect of the present invention, includes: a two-wavelength laser diode having a first laser element and a second laser element arranged in the same package, the first laser element configured to emit a first laser beam, the second laser element configured to emit a second laser beam having a wavelength shorter than a wavelength of the first laser beam; an objective lens configured to condense the first laser beam emitted from the two-wavelength laser diode to a signal recording layer of a first optical disc and condense the second laser beam emitted from the two-wavelength laser diode to a signal recording layer of a second optical disc of a standard different from a standard of the first optical disc; and a collimating lens arranged in an optical path between the two-wavelength laser diode and the objective lens, the collimating lens configured to change the first and second laser beams emitted from the two-wavelength laser diode from divergent light to parallel light, the collimating lens being inclined with respect to optical axes of the first and second laser beams so that astigmatism in the first and second laser beams emitted from the two-wavelength laser diode is corrected.

Other features of the present invention will become apparent from descriptions of this specification and of the accompanying drawings.

BRIEF DESCRIPTION OF THE DRAWINGS

For more thorough understanding of the present invention and advantages thereof, the following description should be read in conjunction with the accompanying drawings, in which.

DETAILED DESCRIPTION OF THE INVENTION

Figure 1:
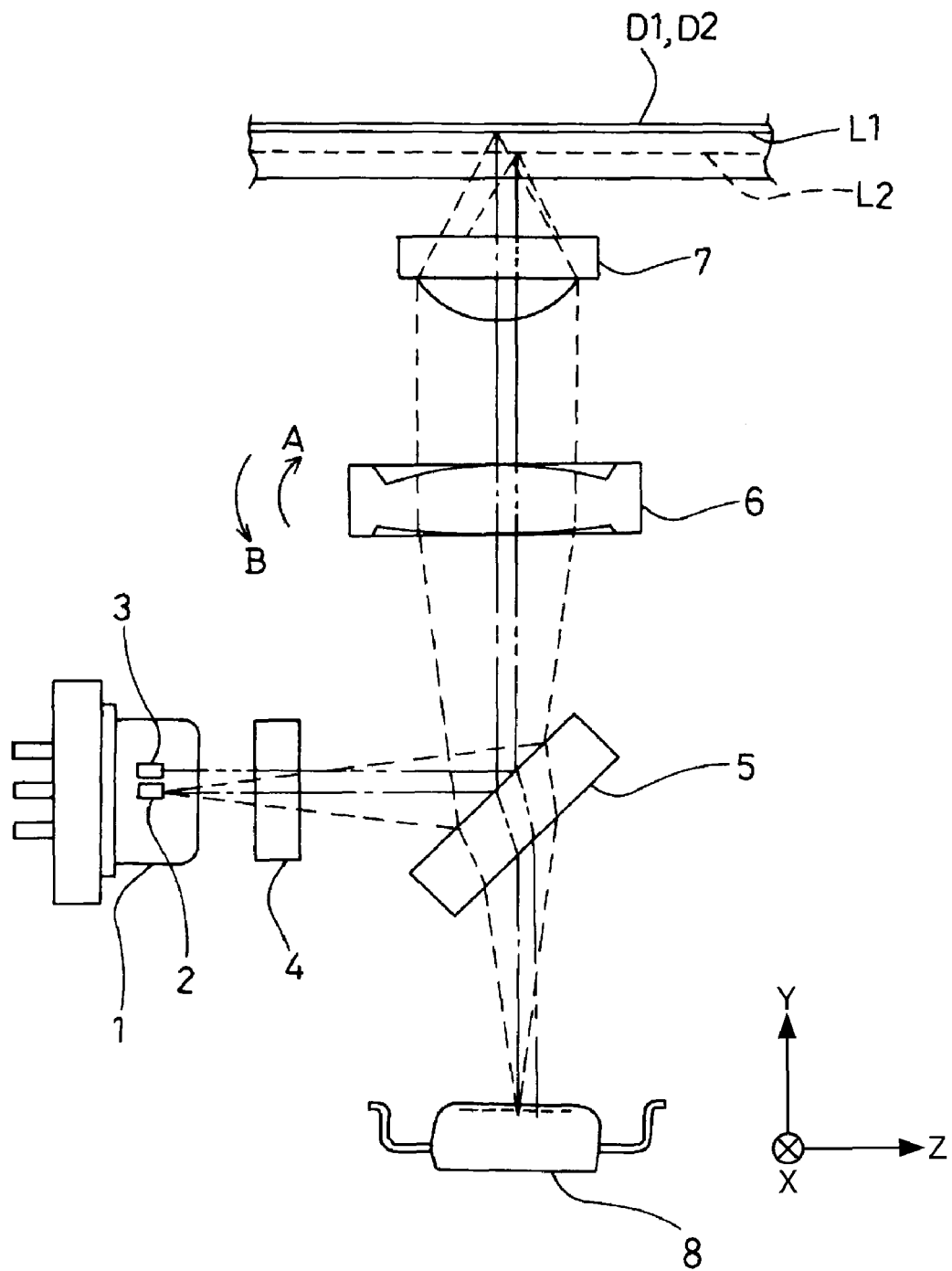
FIG. 1 is a schematic diagram illustrating an optical pickup apparatus according to an embodiment of the present invention.

At least the following details will become apparent from descriptions of this specification and of the accompanying drawings.

An optical pickup apparatus according to an embodiment of the present invention includes: a two-wavelength laser diode provided, in the same package, with a first laser element configured to emit a first laser beam and a second laser element configured to emit a second laser beam having a wavelength shorter than the wavelength of the first laser beam; an objective lens on which the first laser beam and the second laser beam emitted from the two-wavelength laser diode are incident and which condenses the first laser beam to a signal recording layer included in a first optical disc and the second laser beam to a signal recording layer included in a second optical disc of a standard different from that of the first optical disc; and a collimating lens arranged in an optical path between the second wavelength laser diode and the objective lens so as to convert divergent light emitted from the two-wavelength laser diode into parallel light, and corrects astigmatism in the first laser beam and the second laser beam emitted from the two-wavelength laser diode with the collimating lens being inclined with respect to an optical axis.

In the optical pickup apparatus according to an embodiment of the present invention, the first laser element and the second laser element are arranged in a direction orthogonal to the direction in which astigmatism occurs.

In the optical pickup apparatus according to an embodiment of the present invention, the collimating lens is inclined so as to correct the astigmatism caused by displacement of light emitting points of the first laser element and the second laser element.

In the optical pickup apparatus according to an embodiment of the present invention, the collimating lens is inclined (tilted) so that a tilt direction, in which the astigmatism caused accompanying displacement of light emitting points of the first laser element and the second laser element is corrected, and a tilt direction, in which the astigmatism caused by the first laser element and the second laser element is corrected, cross each other at a right angle.

In the optical pickup apparatus according to an embodiment of the present invention, the first laser element is arranged so that the light emitting point of the first laser element passes through the center of the optical axis of the objective lens.

In the optical pickup apparatus according to an embodiment of the present invention, a self-pulsating laser diode (self-pulsation type laser diode) is used as the two-wavelength laser diode.

According to an embodiment of the present invention, the astigmatism in the first laser beam and the second laser beam emitted from the two-wavelength laser diode is corrected with the collimating lens being inclined which is provided so as to convert divergent light into parallel light with respect to the optical axis, that is, the astigmatism caused from the two-wavelength laser diode is corrected without separately providing a particular optical element, and thus an optical configuration is simplified. Therefore, according to an embodiment of the present invention, an optical pickup apparatus with favorable reading characteristics can be provided without incurring an increase in price of the optical pickup apparatus.

In the optical pickup apparatus including the two-wavelength laser diode, the astigmatism caused by the astigmatic difference of the laser diode and the astigmatism caused on the basis of displacement of the light emitting points are corrected with the collimating lens being inclined.

In an embodiment of the present invention, in the optical pickup apparatus configured as shown in FIG. 1, the collimating lens 6 which is disposed in order to change the laser beam to parallel light is inclined, so that the astigmatism is corrected.

Figure 3:
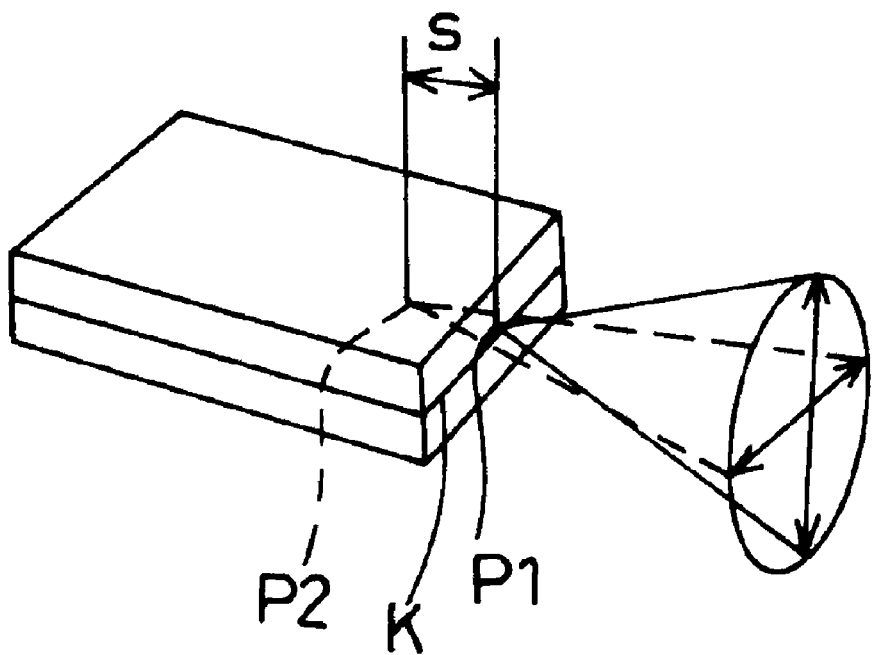
FIG. 3 is a diagram for explaining a light emission operation of a laser diode.

In the first laser beam and the second laser beam emitted from the first laser element 2 and the second laser element 3 included in the two-wavelength laser diode 1, astigmatism is caused by characteristics of each laser element, that is, the astigmatic difference. And a junction portion, which is an active layer of the first laser element 2, and a junction portion, which is an active layer of the second laser element 3, are arranged so as to be in parallel with each other. The astigmatic difference indicates a distance S between a virtual light emitting point P1 in a long diameter direction and a virtual light emitting point P2 in a short diameter direction in each of the first and second laser beams as shown in FIG. 3.

That is, since the junction portion of the first laser element 2 and the junction portion of the second laser element 3 are arranged in the same direction, the long diameter direction of the first laser beam emitted from the first laser element 2 and the long diameter direction of the second laser beam emitted from the second laser element become the same. Therefore, the astigmatism which is caused in the first laser beam by the astigmatic difference of the laser diode with the first laser beam being emitted from the first laser element 2, and the astigmatism which is caused in the second laser beam by the astigmatic difference of the laser diode with the second laser beam being emitted from the second laser element 3, become the same in direction.

In an embodiment of the present invention, the astigmatism caused as above is corrected with the collimating lens 6 being inclined in a direction of an arrow A or B as shown in FIG. 1. The first laser element 2 and the second laser element 3 are arranged on a plane formed by a Y-axis and a Z-axis along a Y-axis direction in the package of the two-wavelength laser diode 1. When correcting the astigmatism caused by the astigmatic difference, the collimating lens 6 is inclined in the direction of the arrow A (clockwise direction in FIG. 1), which is a direction along a plane on which the first laser element 2 and the second laser element 3 are arranged, or is inclined in the direction of the arrow B (counterclockwise direction in FIG. 1) opposite to the direction of the arrow A, with reference to a Z-axis direction, which is parallel with the signal recording layer L1 (L2) of the optical disc D1 (D2) so as to minimize the astigmatism.

The astigmatism caused by the astigmatic difference in the first laser element 2 and the second laser element 3 can be corrected with the collimating lens 6 being inclined in the direction of the arrow A or B as described above, however, since the first laser element 2 and the second laser element 3 are arranged with the light emitting points thereof displaced from each other, the astigmatism is caused by the displacement of the light emitting points.

Figure 2:
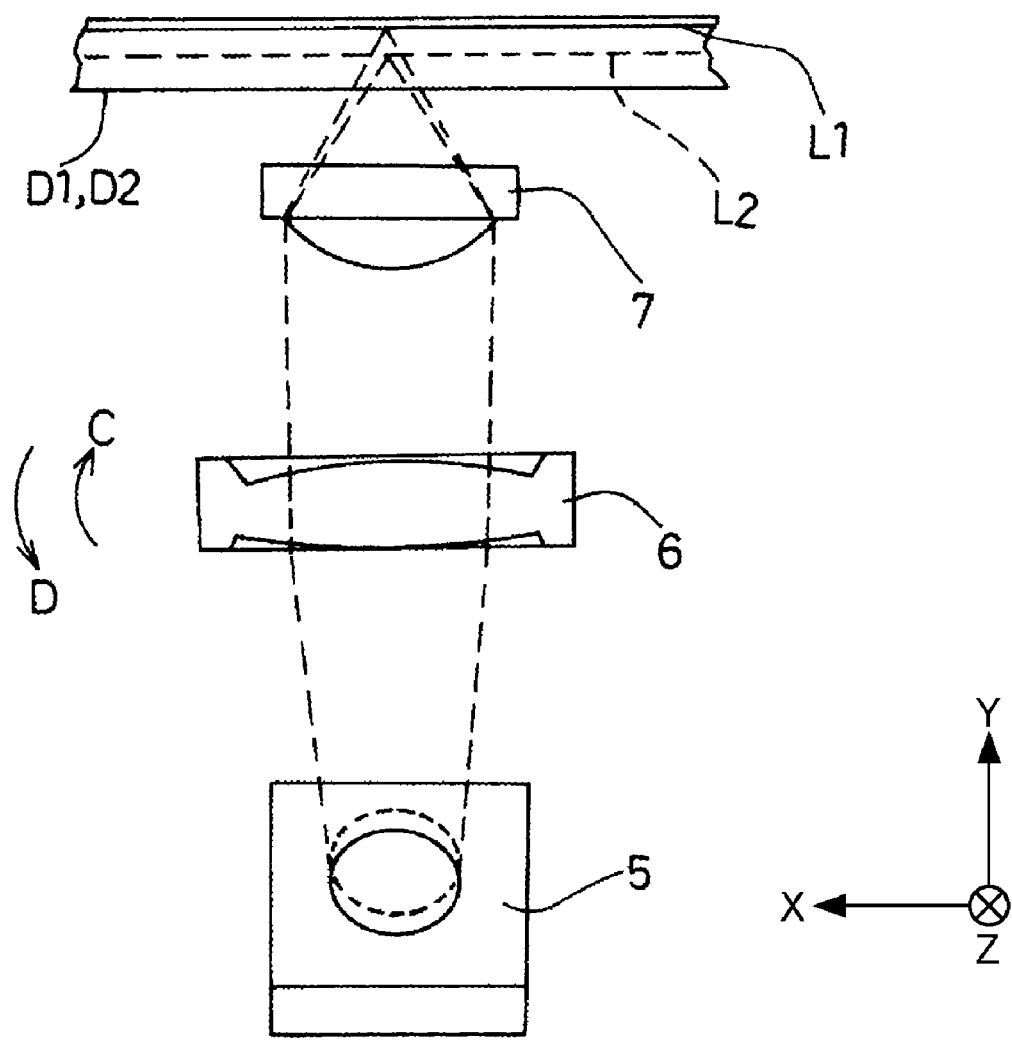
FIG. 2 is a schematic diagram of an essential part of an optical pickup apparatus according to an embodiment when seen from a direction different from that in FIG. 1.

A direction of the occurrence of the astigmatism caused by the displacement in arrangements of the first laser element 2 and the second laser element 3 is in an orthogonal relationship with the direction of the astigmatism caused by the above-described astigmatic difference in the laser diode. In an embodiment of the present invention, the astigmatism caused by such displacement in arrangement is corrected with the collimating lens 6 being inclined in the direction of an arrow C or D in FIG. 2. When correcting the astigmatism caused by the displacement in arrangement between the first laser element 2 and the second laser element 3 (a distance between the first laser element 2 and the second laser element 3 in the Y-axis direction), the collimating lens 6 is inclined in the direction of the arrow C (clockwise direction in FIG. 2) or is inclined in the direction of the arrow D (counterclockwise direction in FIG. 2) opposite to that of the arrow C, with reference to the X-axis direction, which is parallel with the signal recording layer L1 (L2) of the optical disc D1 (D2) and orthogonal to the Z-axis, so as to minimize the astigmatism. The directions of the arrows C and D are orthogonal to directions of the arrows A and B.

As described above, the operation of tilting the collimating lens 6 is performed such that the tilt direction, in which the astigmatism caused by the astigmatic difference in the laser diode is corrected, is orthogonal to the tilt direction in which the astigmatism caused by the displacement in arrangement between the first laser element 2 and the second laser element 3 is corrected, and thus the collimating lens 6 is configured so as to be able to perform an operation of moving in two axial directions.

In the optical pickup apparatus configured as described above, an operation of assembling the optical pickup apparatus is performed such that the operation of tilting the collimating lens 6 is performed in two axial directions and that the collimating lens 6 is bonded and fixed in a housing (not shown) at a position where the astigmatism is the smallest.

A laser beam having a longer wavelength has such characteristics as to be more susceptible to image height characteristics caused by the astigmatism, and therefore, if a configuration is made such that the light emitting point of the first laser element 2 configured to emit the first laser beam, which is a laser beam having a long wavelength, is on the center of the optical axis of the objective lens 7, that is, if the first laser element 2 is arranged such that the first laser beam passes through the center of the optical axis of the objective lens 7, an optical pickup apparatus with favorable characteristics can be manufactured.

An embodiment of the present invention can be applied not only to an optical pickup apparatus configured to perform an operation of reading signals recorded in optical discs of the DVD standard and the CD standard, but also to optical pickup apparatuses configured to perform operations of reading signals recorded in optical discs of other standards.

The above embodiments of the present invention are simply for facilitating the understanding of the present invention and are not in any way to be construed as limiting the present invention. The present invention may variously be changed or altered without departing from its spirit and encompass equivalents thereof.

What is claimed is:

1. An optical pickup apparatus comprising:
    a laser diode having a first laser element and a second laser element arranged in the same package, the first laser element configured to emit a first laser beam, the second laser element configured to emit a second laser beam having a wavelength shorter than a wavelength of the first laser beam;
    an objective lens configured to condense the first laser beam emitted from the laser diode to a signal recording layer of a first optical disc and condense the second laser beam emitted from the laser diode to a signal recording layer of a second optical disc of a standard different from a standard of the first optical disc; and
    a collimating lens arranged in an optical path between the laser diode and the objective lens, the collimating lens configured to change the first and second laser beams emitted from the laser diode from divergent light to parallel light,
    the collimating lens being inclined with respect to optical axes of the first and second laser beams so that first and second astigmatisms in the first and second laser beams emitted from the laser diode are corrected, the first astigmatism caused by an astigmatic difference of the first and second laser elements, the second astigmatism caused by displacement of the light emitting points of the first and second laser elements, the astigmatic difference being a distance between a virtual light emitting point in a short diameter direction and a virtual light emitting point in a long diameter direction in each of the first and second laser beams.

2. The optical pickup apparatus according to claim 1, wherein the first and second laser elements are arranged in a direction orthogonal to a direction in which the astigmatism occurs.

3. The optical pickup apparatus according to claim 1, wherein the collimating lens is inclined about a first rotation axis when the first astigmatism is corrected and the collimating lens is inclined about a second rotation axis orthogonal to the first rotation axis when the second astigmatism is corrected.

4. The optical pickup apparatus according to claim 3, wherein
    the first rotation axis is orthogonal to a plane containing optical axes of the first and second laser beams, and the second rotation axis is orthogonal to the first rotation axis and the optical axes of the first and second laser beams.

5. The optical pickup apparatus according to claim 1, wherein the first laser element is arranged so that the first laser beam passes through the center of the optical axis of the objective lens.

6. The optical pickup apparatus according to claim 1, wherein the laser diode is a self-pulsation type laser diode.

7. An optical pickup apparatus comprising:
    a laser diode having a first laser element and a second laser element arranged in the same package, the first laser element configured to emit a first laser beam, the second laser element configured to emit a second laser beam having a wavelength shorter than a wavelength of the first laser beam;
    an objective lens configured to condense the first laser beam emitted from the laser diode to a signal recording layer of a first optical disc and condense the second laser beam emitted from the laser diode to a signal recording layer of a second optical disc of a standard different from a standard of the first optical disc; and
    a collimating lens arranged in an optical path between the laser diode and the objective lens, the collimating lens configured to change the first and second laser beams emitted from the laser diode from divergent light to parallel light,
    wherein the collimating lens is configured to incline about a first rotation axis and to incline about a second rotation axis orthogonal to the first rotation axis.

8. The optical pickup apparatus according to claim 7, wherein
    the first rotation axis is orthogonal to a plane in which containing optical axes of the first and second laser beams, and
    the second rotation axis is orthogonal to the first rotation axis and the optical axes of the first and second laser beams.

9. The optical pickup apparatus according to claim 7, wherein the first laser element is arranged so that the first laser beam passes through the center of the optical axis of the objective lens.

10. The optical pickup apparatus according to claim 7, wherein the laser diode is a self-pulsation type laser diode.

* * * * *